United States Patent
Schreter

(10) Patent No.: US 10,725,846 B1
(45) Date of Patent: Jul. 28, 2020

(54) REFERENCE DEBUGGING USING ASSOCIATIVE REGISTRY

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/373,408

(22) Filed: Apr. 2, 2019

(51) Int. Cl.
*G06F 9/44* (2018.01)
*G06F 11/07* (2006.01)
*G06F 11/36* (2006.01)
*G06F 8/73* (2018.01)
*G06F 9/455* (2018.01)
*G06F 12/02* (2006.01)

(52) U.S. Cl.
CPC .......... *G06F 11/0766* (2013.01); *G06F 8/73* (2013.01); *G06F 11/362* (2013.01); *G06F 11/3612* (2013.01); *G06F 11/3636* (2013.01); *G06F 11/3664* (2013.01); *G06F 12/0269* (2013.01); *G06F 2009/45591* (2013.01)

(58) Field of Classification Search
CPC ............. G06F 11/0715; G06F 11/3612; G06F 11/362; G06F 12/0269; G06F 11/3636; G06F 11/3409; G06F 2009/45591; G06F 11/0766; G06F 11/3664
See application file for complete search history.

(56) References Cited

U.S. PATENT DOCUMENTS

| | | | | |
|---|---|---|---|---|
| 6,553,564 | B1* | 4/2003 | Alexander, III | G06F 11/3409 717/124 |
| 7,404,182 | B1* | 7/2008 | Garthwaite | G06F 12/0269 707/999.202 |
| 2006/0282419 | A1* | 12/2006 | Sen | G06F 11/3636 |
| 2011/0138236 | A1* | 6/2011 | Park | G06F 11/0715 714/57 |
| 2011/0225592 | A1* | 9/2011 | Goldin | G06F 11/3612 718/104 |
| 2011/0296385 | A1* | 12/2011 | Wielaard | G06F 11/362 717/124 |
| 2015/0378870 | A1* | 12/2015 | Marron | G06F 11/362 717/128 |

* cited by examiner

*Primary Examiner* — Tuan A Vu
(74) *Attorney, Agent, or Firm* — Mintz Levin Cohn Ferris Glovsky and Popeo, P.C.

(57) ABSTRACT

A system and method of collecting debugging information for code running in a multi-threaded computing system. An association record is generated in an associative registry. The association record has a timestamp, an object pointer and/or further information. Upon detection of a bug, the computing system generates a debug report based on the association record and the detected bug, the debug reference comprising a reference type that references a portion of the code running in the multi-threaded computing system. Based on the debug reference, a lifecycle check of the portion of the code running in the multi-threaded computing system is generated, the lifecycle check annotating the bug within the portion of the code running in the multi-threaded computing system.

15 Claims, 2 Drawing Sheets

REFERENCE DEBUGGING USING ASSOCIATIVE REGISTRY

TECHNICAL FIELD

The subject matter described herein relates to debugging of complex software programs, and more particularly to reference debugging using an associative registry.

BACKGROUND

In complex programs, such as multi-threaded applications in a database management system, as an example SAP's HANA® database (DB), it is inevitable that there will be some "bugs," or errors in the computer program code or other part of the computing system. One particular type of bug involves a wrong reference counting, which may cause memory leaks. If such memory leaks accumulate over time, they may consume resources, such as memory, that are needed elsewhere. Similarly, another type of bug includes an object being destroyed in one thread while another thread is referencing that object, in which the program will most likely crash or fail.

Current SAP HANA® DB already employs a different version of debug references, albeit not yet for asynchronous continuations. These debug references require annotating not only reference classes (handles, smart pointers, etc.), but also each object to be referenced to include an anchor object storing information about references. Unfortunately, this anchor object is fairly big, so it does interfere at memory management level.

Further, current HANA® DB implementation limits number of collected references to 8 (due to space limitations in the anchor object), so if the object is referenced often (having 1000s of references for some objects is a valid use case), the space is not sufficient to store information about all the references and some will be inevitably lost.

What is needed is a system and method for obtaining additional useful debugging information for the above-described types of bugs.

SUMMARY

This document describes a system and method for obtaining useful debugging information, particularly for the types of bugs described above. The method described here does not require annotating referenced objects, just references (smart pointers and the like). The method described here does not suffer from limitations of a maximum number of collected references, since it can associate an unlimited number of debug_reference objects with a particular object. Further, the system and method described herein has improved scalability than original debugging implementations implemented in conventional ways in HANA® DB In one aspect, a method of collecting debugging information for code running in a multi-threaded computing system is provided. The method includes generating an association record in an associative registry, the association record having a timestamp, an object pointer and/or further information such as call stack trace at the time of the record generation. The method further includes detecting a bug in the multi-threaded computing system, the bug including at least one of a reference count error that creates a memory leak, and a destruction of an object while the object is still being referenced by the multi-threaded computing system. The method further includes identifying, by the computing system, a debug reference based on the faulty or leaked object pointer, the debug reference associated with this object in the multi-threaded computing system. The method further includes generating, based on the debug references to the object, a debug report with a list of references still referencing a leaked object. The method further includes a lifecycle check, the lifecycle check annotating the object with a debug reference so in case of wrong reference counting, any secondary references in the portion of the code running in the multi-threaded computing system can be identified and debug report provided to the developer.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A system and method is described herein, by which debugging information for various types of bugs can be collected. In some implementations, a system and method can be built on, or integrate with, an associative registry.

Figure 1:
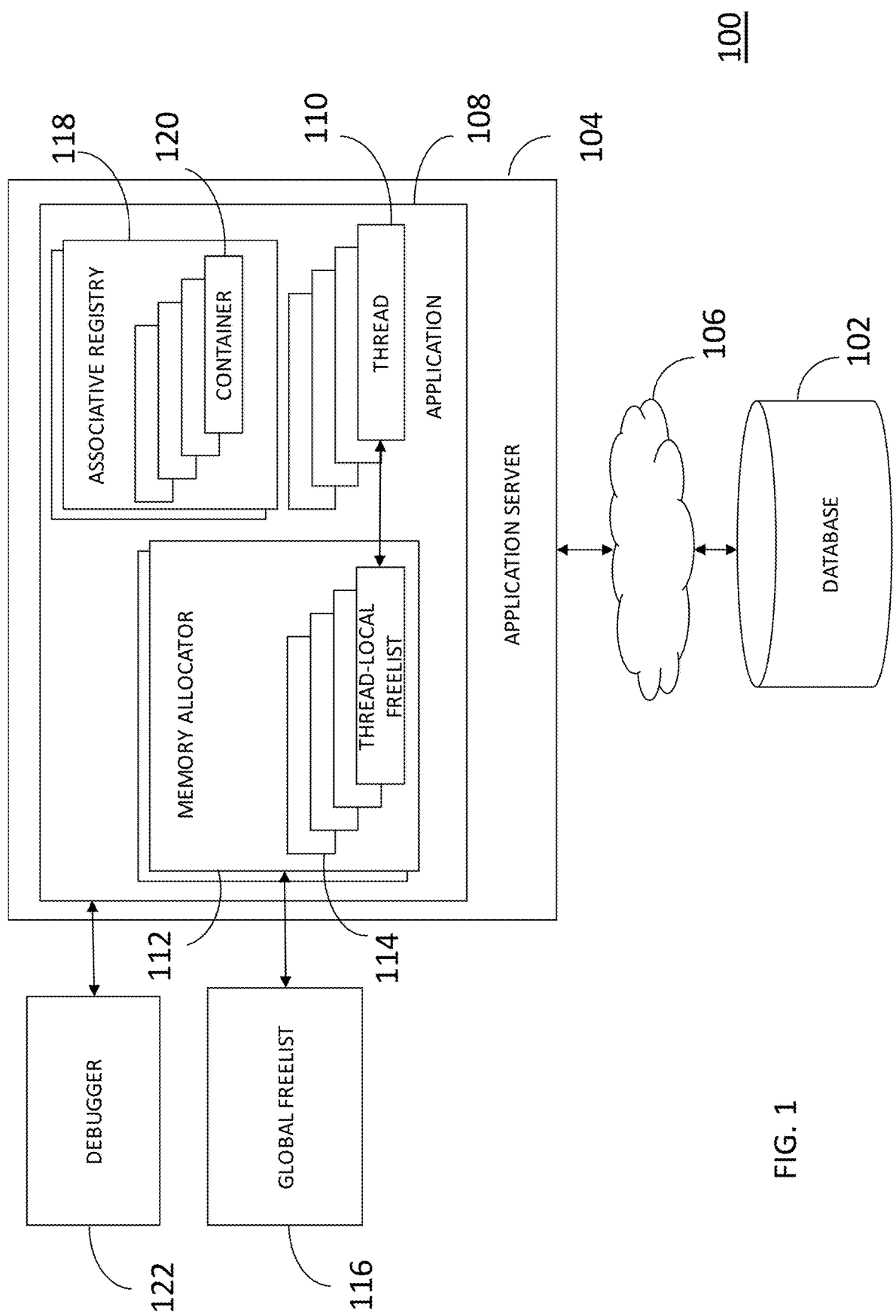
FIG. 1 shows a diagram illustrating aspects of a system showing features consistent with implementations of the current subject matter.

FIG. 1 depicts a computing system 100 that can implement the presently disclosed system and method. The computing system 100 includes a database 102 or other memory structure. The database 102 can be part of an in-memory, column-oriented, relational database management system (DBS) developed and marketed by SAP SE, for example. The database 102 can store and retrieve data as requested by applications that are allowed access to the database 102. In addition, the database 102, as part of a DBS, can perform advanced analytics (predictive analytics, spatial data processing, text analytics, text search, streaming analytics, graph data processing) and includes extract, transform, load (ETL) capabilities.

The system 100 can further include an application server 104, which can communicate with the database 102 directly or via a communication network 106. The communication network 106 can include any number of networks and computing nodes, and can also be referred to herein as the "cloud." The application server 104 executes an application 108 using data stored in the database 102. The application 108 can have one or more executable threads 110, where each thread executes and/or processes a portion of the application 108.

The application 108 of the application server 104 of the system 100 can further include a high-performance memory allocator 112, which includes one or more thread-local freelists 114 for allocating memory blocks to a corresponding one or more threads 110 based on a thread's need for memory. The memory allocator 112 further includes a global freelist 116. The memory allocator 112, thread-local freelist 114, and global freelist 116, and their operation, are described in further detail below.

In accordance with some implementations, the system 100 can include an associative registry 118, as described herein. The associative registry 118 can include one or more containers 120 for storing objects or references to objects. The associative registry 118 can be configured for managing highly-volatile registration/deregistration of objects without synchronization, but also for being able to enumerate these objects externally from the system 100. The system 100 can further include a debugger 122, in communication with (i.e. wrapped in) the associative registry 118, for gathering additional useful debugging information for various types of bugs, in particular wrong reference counting, or if an object is destroyed while a user or program is still referencing it.

Data Structures

To store information about references to an object, an association record in the following form is used and stored in associative registry:

struct debug_reference
{
void* target;
time timestamp;
callstack stack_trace;
};

This debug reference describes where and when it was created (using stack_trace and timestamp fields) and to which object it points. Stack trace can be for instance stored as a fixed-size array of pointers to code segment, which can be later resolved to actual symbols. The timestamp can be stored, for example, as the amount of time since some predefined time point (e.g., nanoseconds since Unix epoch).

Creating debug_reference objects is fully scalable, since underlying associative registry is fully scalable. Further, except collecting (optional) stack trace, it is also fast, so it doesn't cause significant performance degradation (call stack trace does cause notable performance degradation, but it can be also collected in a scalable way). Typically, stack traces will be collected despite performance degradation, because they provide a great value to the programmer analyzing the bug.

Leak Checking

For the leak check, each reference type (handle, smart pointer, etc.) is instrumented with a pointer to debug_reference created at the time the reference is created. Since there is a limited number of reference types, this requires only fairly local code change for all potential references.

When the programmer detects a leaked object (or just wants to get list of references to an object programmatically, e.g., in debug code), then the associative registry of debug references can be consulted and all references to the target object found by filtering it by target object. The filter has a high selectivity, but due to lack of additional index structures, the entire debug reference registry needs to be enumerated. This is sufficient, since evaluating the registry is a rare event and typically triggered by a human, so the response time of a few milliseconds (when millions of debug references are registered) is not an issue.

Using debug references, it is possible to dump detailed information about where and when the leaked object has been referenced (as opposed to simple allocation call stack). This greatly helps analyzing this type of bugs.

Invalid Lifecycle Checking

When using asynchronous programming, pointers to objects are transferred across asynchronous continuations. Due to programming errors, it can happen that the pointed-to object is destroyed before the asynchronous operation runs. To detect this situation, it's possible to add a secondary reference count to the object in question and increment it for each object pointer passed to asynchronous continuation, decrementing it back inside of the asynchronous continuation (e.g., in debug builds). The destructor of the object can check, whether secondary reference count is zero (i.e., there are no outstanding pointers to the object in some asynchronous operation closure).

The check itself will give us the information that there is an error, but not where. Fortunately, it's possible to associate a debug_reference with the pointer to object passed via async closure and pass it as well. This debug_reference will then be destroyed together with the closure when the pointer to object is not needed anymore.

If debug references are used, then the destructor of the object which finds that the object is still referenced somewhere can consult the debug_reference registry and dump out diagnostic information about where the references are still in use. This greatly eases finding of bugs in complex asynchronous code.

Figure 2:
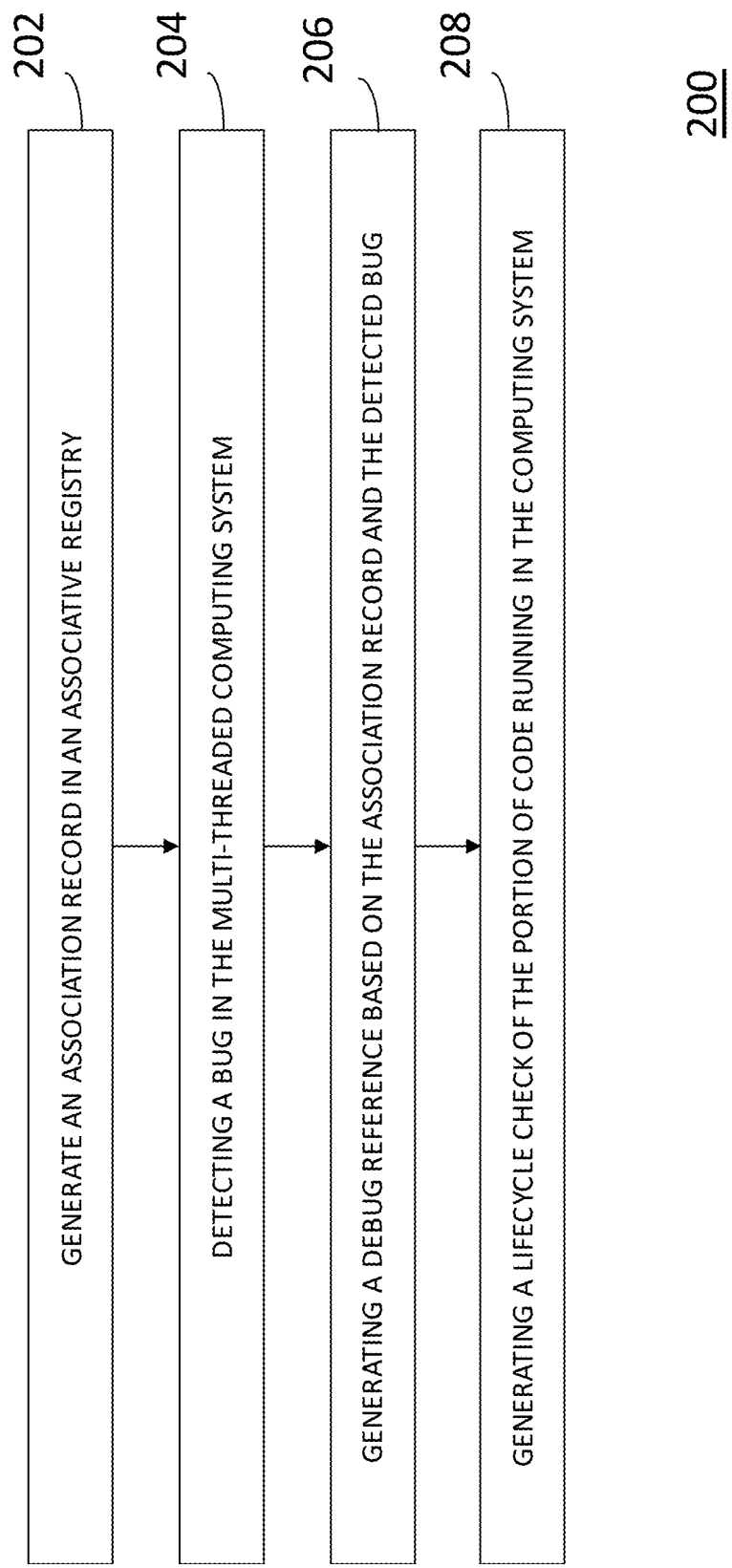
FIG. 2 shows a process flow diagram illustrating aspects of a method having one or more features consistent with implementations of the current subject matter.

FIG. 2 is a flowchart of a method 200 of collecting debugging information for code running in a multi-threaded computing system, such as is illustrated in FIG. 1. At 202, an association record is generated in an associative registry. The association record can have a timestamp, an object pointer, and/or further information such as call stack trace at the time of record creation. At 204, a bug in the multi-threaded computing system can be detected. The bug can include at least one of a reference count error that creates a memory leak, and a destruction of an object while the object is still being referenced by the multi-threaded computing system. At 206, the computing system generates a debug report based on the association record and the detected bug, the debug reference can includes a reference type that references a portion of the code running in the multi-threaded computing system. At 208, based on the debug reference, a lifecycle check of the portion of the code running in the multi-threaded computing system is generated. The lifecycle check annotates the bug within the portion of the code running in the multi-threaded computing system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of collecting debugging information for code running in a multi-threaded computing system, the method comprising:

generating an association record in an associative registry, the association record having a timestamp, an object pointer and/or further information such as call stack trace at the time of the association record creation, the record for collecting instrumentation data associated with execution of the multi-thread system;

detecting a bug in the multi-threaded computing system, the bug including at least one of a reference count error that creates a memory leak and a destruction of an object while the object is still being referenced by the multi-threaded computing system;

generating, by the computing system, a debug reference based on the instrumentation data registered in the association record in response to the detected bug, the debug reference comprising a reference type that references a portion of the code running in the multi-threaded computing system; and generating, based on the debug reference, a lifecycle check of the portion of the code running in the multi-threaded computing system, the lifecycle check annotating the bug within the portion of the code running in the multi-threaded computing system.

2. The method in accordance with claim 1, further comprising storing the lifecycle check as an object in the associative registry.

3. The method in accordance with claim 1, wherein the debug reference includes a smart pointer.

4. The method in accordance with claim 1, wherein the debug reference includes a location in the multi-threaded computing system, and a time of creation of the bug and/or additional information such as call stack trace at the record creation time.

5. The method in accordance with claim 4, wherein the location and the time and any other information are stored for transmission across an asynchronous continuation to detect wrong lifecycle of the referenced object.

6. A system for allocating memory to a thread of a multi-threaded program, the system comprising:
   a programmable processor; and
   a machine-readable medium storing instructions that, when executed by the processor, cause the at least one programmable processor to perform operations comprising:
   generate an association record in an associative registry, the association record having a timestamp and an object pointer and/or further information such as call stack trace at the time of the record creation, the record for collecting instrumentation data associated with execution of the multi-thread system;
   detect a bug in the multi-threaded computing system, the bug including at least one of a reference count error that creates a memory leak and a destruction of an object while the object is still being referenced by the multi-threaded computing system;
   generate, by the computing system, a debug reference based on the instrumentation data registered in the association record in response to the detected bug, the debug reference comprising a reference type that references a portion of the code running in the multi-threaded computing system; and
   generate, based on the debug reference, a lifecycle check of the portion of the code running in the multi-threaded computing system, the lifecycle check annotating the bug within the portion of the code running in the multi-threaded computing system.

7. The system in accordance with claim 6, wherein the operations further comprise operations to store the lifecycle check as an object in the associative registry.

8. The system in accordance with claim 6, wherein the debug reference includes a smart pointer.

9. The system in accordance with claim 6, wherein the debug reference includes a location in the multi-threaded computing system, and a time of creation of the bug.

10. The system in accordance with claim 9, wherein the location and the time are stored for transmission across an asynchronous continuation.

11. A computer program product comprising a non-transitory machine-readable medium storing instructions that, when executed by at least one programmable processor, cause the at least one programmable processor to perform operations comprising:
    generate an association record in an associative registry, the association record having a timestamp and an object pointer and/or further information such as call stack trace at the time of the record creation, the record for collecting instrumentation data associated with execution of the multi-thread system;
    detect a bug in the multi-threaded computing system, the bug including at least one of a reference count error that creates a memory leak and a destruction of an object while the object is still being referenced by the multi-threaded computing system;
    generate, by the computing system, a debug reference based on the instrumentation data registered in the association record in response to the detected bug, the debug reference comprising a reference type that references a portion of the code running in the multi-threaded computing system; and
    generate, based on the debug reference, a lifecycle check of the portion of the code running in the multi-threaded computing system, the lifecycle check annotating the bug within the portion of the code running in the multi-threaded computing system.

12. The computer program product in accordance with claim 11, wherein the operations further comprise operations to store the lifecycle check as an object in the associative registry.

13. The computer program product in accordance with claim 11, wherein the debug reference includes a smart pointer.

14. The computer program product in accordance with claim 11, wherein the debug reference includes a location in the multi-threaded computing system, and a time of creation of the bug.

15. The computer program product in accordance with claim 14, wherein the location and the time are stored for transmission across an asynchronous continuation.

\* \* \* \* \*